(12) United States Patent
Bhuiya et al.

(10) Patent No.: US 10,169,207 B2
(45) Date of Patent: Jan. 1, 2019

(54) SMART EMULATOR FOR WEARABLE DEVICES

(71) Applicant: International Business Machines Corporation, Armonk, NY (US)

(72) Inventors: Subhajit Bhuiya, Bangalore (IN); Vijay Ekambaram, Chennai (IN); Donald A. Padilla, Albuquerque, NM (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/897,188

(22) Filed: Feb. 15, 2018

(65) Prior Publication Data
US 2018/0150388 A1 May 31, 2018

Related U.S. Application Data

(63) Continuation of application No. 15/353,786, filed on Nov. 17, 2016.

(51) Int. Cl.
*G06F 11/36* (2006.01)

(52) U.S. Cl.
CPC ...... *G06F 11/3664* (2013.01); *G06F 11/3684* (2013.01)

(58) Field of Classification Search
CPC .......................... G06F 11/3664; G06F 11/3684
USPC ........................................................ 717/124
See application file for complete search history.

(56) References Cited

U.S. PATENT DOCUMENTS

| | | | |
|---|---|---|---|
| 3,651,694 | A | 3/1972 | Lamb |
| 5,035,247 | A | 7/1991 | Heimann |
| 5,109,863 | A | 5/1992 | Semmlow et al. |
| 5,301,679 | A | 4/1994 | Taylor |
| 5,461,700 | A | 10/1995 | Kimura et al. |
| 6,474,159 | B1 | 11/2002 | Foxlin et al. |
| 6,527,711 | B1 | 3/2003 | Stivoric et al. |
| 6,646,643 | B2 | 11/2003 | Templeman |
| 7,130,452 | B2 | 10/2006 | Bolle et al. |
| 7,236,161 | B2 | 6/2007 | Geaghan et al. |
| 7,825,815 | B2 | 11/2010 | Shears et al. |
| 8,448,056 | B2 | 5/2013 | Pulsipher et al. |

(Continued)

FOREIGN PATENT DOCUMENTS

| | | |
|---|---|---|
| CN | 103530231 A | 1/2014 |
| EP | 0942404 A2 | 9/1999 |

(Continued)

OTHER PUBLICATIONS

Alrazgan et al., "Learning Occupancy Prediction Models with Decision-Guidance Query Language", Proceedings of the 44th Hawaii International Conference on System Sciences—2011, 1530-1605/11 © 2011 IEEE, 10 pages.

(Continued)

*Primary Examiner* — John Q Chavis
(74) *Attorney, Agent, or Firm* — Edward J. Wixted, III

(57) ABSTRACT

Input of a video file is received. The video file includes video of a representation of a wearable device. One or more motion vector data is determined based on the video file. One or more motion sensor data is generated based on the motion vector data. One or more test results are determined using the motion sensor data. The video file, the motion vector data, and the motion sensor data are stored.

1 Claim, 4 Drawing Sheets

(56) References Cited

U.S. PATENT DOCUMENTS

| | | | |
|---|---|---|---|
| 8,633,890 | B2 | 1/2014 | Tossell et al. |
| 8,961,438 | B2 | 2/2015 | Gravem et al. |
| 9,202,193 | B2 | 12/2015 | Kwak |
| 2006/0005067 | A1 | 1/2006 | Llyod |
| 2013/0150121 | A1 | 6/2013 | Jeffery et al. |
| 2013/0261771 | A1 | 10/2013 | Ten Kate |
| 2013/0278539 | A1 | 10/2013 | Valentine et al. |
| 2013/0328581 | A1 | 12/2013 | Lee et al. |
| 2014/0065586 | A1 | 3/2014 | Gabbai |
| 2015/0127541 | A1 | 5/2015 | Just et al. |
| 2015/0237045 | A1 | 8/2015 | Blessing |
| 2015/0251074 | A1* | 9/2015 | Ahmed ............ A61B 5/02405 700/91 |
| 2015/0366504 | A1 | 12/2015 | Connor |
| 2015/0370320 | A1 | 12/2015 | Connor |
| 2016/0026560 | A1 | 1/2016 | Jackson et al. |
| 2016/0059120 | A1 | 3/2016 | Komorous-King et al. |
| 2016/0085366 | A1* | 3/2016 | Chi ..................... G06F 3/0488 345/173 |
| 2016/0189440 | A1 | 6/2016 | Cattone |
| 2016/0246492 | A1* | 8/2016 | Baldassari .......... H04M 1/7253 |
| 2016/0364321 | A1 | 12/2016 | Nuriel et al. |
| 2017/0272842 | A1 | 9/2017 | Touma et al. |

FOREIGN PATENT DOCUMENTS

| | | |
|---|---|---|
| WO | 2012051654 A1 | 4/2012 |
| WO | 2012164482 A1 | 12/2012 |
| WO | 2014122467 A1 | 8/2014 |
| WO | 2015056239 A1 | 4/2015 |

OTHER PUBLICATIONS

Andrusiv, Ostap, "Google Glass Development Without Glass", Mobility & Wearables, ELEKS Labs, 1999-2016 (C) ELEKS, All Rights Reserved, Nov. 1, 2013, 9 pages, <http://elekslabs.com/2013/11/google-glass-development-without-glass.html>.

Bassett, Jr. et al., "Calibration and Validation of Wearable Monitors", Published in final edited form as: Med Sci Sports Exerc. Jan. 2012; 44(1 Suppl 1): S32-S38. doi:10.1249/MSS.0b013e3182399cf7 Source: PubMed, Med Sci Sports Exerc. Author manuscript; available in PMC Jan. 1, 2013, ResearchGate, Retrieved on: Oct. 7, 2016, 14 pages.

Hafeez, Muddassir, "You Can Test Drive for Apple iWatch With This Free Website", TechCroc, Posted on Jan. 8, 2015, 8 pages, <http://www.techcroc.com/test-drive-apple-iwatch-free-website/>.

Han et al., "Enhanced Computer Vision with Microsoft Kinect Sensor: A Review", IEEE Transactions on Cybernetics, 2168-2267 @ 2013 IEEE, 17 pages.

Sollenberger et al., "Human-in-the-Loop Simulation Evaluating the Collocation of the User Request Evaluation Tool, Traffic Management Advisor, and Controller-Pilot Data Link Communications: Experiment I—Tool Combinations", Feb. 2005 DOT/FAA/CT-TN04/28, U.S. Department of Transportation Federal Aviation Administration, ResearchGate, Retrieved on: Oct. 7, 2016, 85 pages.

Sookoor, Tamim I., "Application Development for Cyber-Physical Systems: Programming Language Concepts and Case Studies", A Dissertation Presented to the Faculty of the School of Engineering and Applied Science University of Virginia, Aug. 2012, © 2012 Tamim I. Sookoor, 186 pages.

Uswak, Iwan, "Google Glass Sensors", Google Glass Apps, May 7, 2013, 8 pages, <http://glass-apps.org/google-glass-sensors>.

"IBM Releases 100th IBM MobileFirst for iOS App in Partnership with Apple to Transform the Nature of Work", Made-for-business apps to embed cognitive capability, IBM News room—Dec. 16, 2015, 5 pages. <https://www-03.ibm.com/press/us/en/pressrelease/48482.wss>.

Hale, Matthew, L. et al., "SecuWear: An open source, multi-component hardware/software platform for exploring wearable security", 2015 IEEE International Conference on Mobile Services, 978-1-4673-7284-8/15 © 2015 IEEE DOI 10.1109/MS.2015.23, pp. 97-104.

Helppi, Ville-Veikko, "App Development and Testing on Wearables", bitbar, Mar. 31, 2015, 9 pages, <http://bitbar.com/app-development-and-testing-on-wearables/>.

Thongkham, Cheylene, "Wearable App Testing", Crowdsourced Testing, Smarter software testing, Nov. 27, 2014, 4 pages, <https://crowdsourcedtesting.com/resources/wearable-app-testing/>.

Thongkham, Cheylene, "Software Testing: Key Trends to Keep an Eye on in 2015", Lean Testing, Feb. 4, 2015, 5 pages, <https://leantesting.com/resources/software-testing-trends-2015/>.

"Testing Wearables" Applause, © Copyright 2016 Applause App Quality, Inc., 4 pages, <http://www.applause.com/wearables/>.

"7Bot Desktop Robot Arm—record and replay", YouTube, Published on Aug. 30, 2015, 4 pages, <https://www.youtube.com/watch?v=rUl9n-yR9hs>.

"Robot Arm Record and Repeat Movements", YouTube, Published on May 11, 2013, 4 pages, <https://www.youtube.com/watch?v=QVsdaPGUn1o>.

"Movement recorder—record and playback a sequence of steps on a robotic arm", YouTube, Published on Jun. 1, 2014, 4 pages, <https://www.youtube.com/watch?v=Q967_9V6C-k>.

Bhuiya et al., "Smart Emulator for Wearable Devices", U.S. Appl. No. 15/353,786, filed Nov. 17, 2016, 32 pages.

IBM, "List of Patent Applications Treated as Related", Appendix P, Dated xx/xx/xxxx, 2 pages.

* cited by examiner

SMART EMULATOR FOR WEARABLE DEVICES

BACKGROUND

The present invention relates generally to the field of wearable devices, and more particularly to generating data for testing applications designed for wearable devices via an emulator.

Wearable devices, or more broadly, wearable technology, are clothing and accessories incorporating computer and other advanced electronic technologies. The designs of these "wearables" often incorporate practical functions and features such as tracking the number of steps a user takes during the day and monitoring the pulse rate of a user. Activity trackers, smart watches, and glasses that connect to the Internet are three examples of wearable devices.

SUMMARY OF THE INVENTION

Embodiments of the present invention include a method, computer program product, and system for generating data for testing applications designed for wearable devices via an emulator. In one embodiment, input of a video file is received. The video file includes video of a representation of a wearable device. One or more motion vector data is determined based on the video file. One or more motion sensor data is generated based on the motion vector data. One or more test results are determined using the motion sensor data. The video file, the motion vector data, and the motion sensor data are stored.

DETAILED DESCRIPTION

Embodiments of the present invention provide for generating data for testing applications designed for wearable devices via an emulator. Application testing may need to occur prior to a wearable device being available. Therefore, motion sensor data for the wearable device needs to be generated without the wearable device so that the application testing can be completed. Performing the application testing allows the application developer to make changes to the application so that the application will be available when the wearable device is available. Generating the motion sensor data is difficult as human movement is variable while test input is static. In addition, a high probability exists of missing edge cases (i.e., cases that occur at a minimum or at a maximum parameter) based on the variable human movement.

Embodiments of the present invention recognize that there may be a method, computer program product, and computer system for generating data for testing applications designed for wearable devices via an emulator. The method, computer program product and computer system may use video of a mock wearable device to determine motion vector data, and generate motion sensor data for use by an emulator when testing an application designed for a wearable device.

The present invention will now be described in detail with reference to the Figures.

Figure 1:
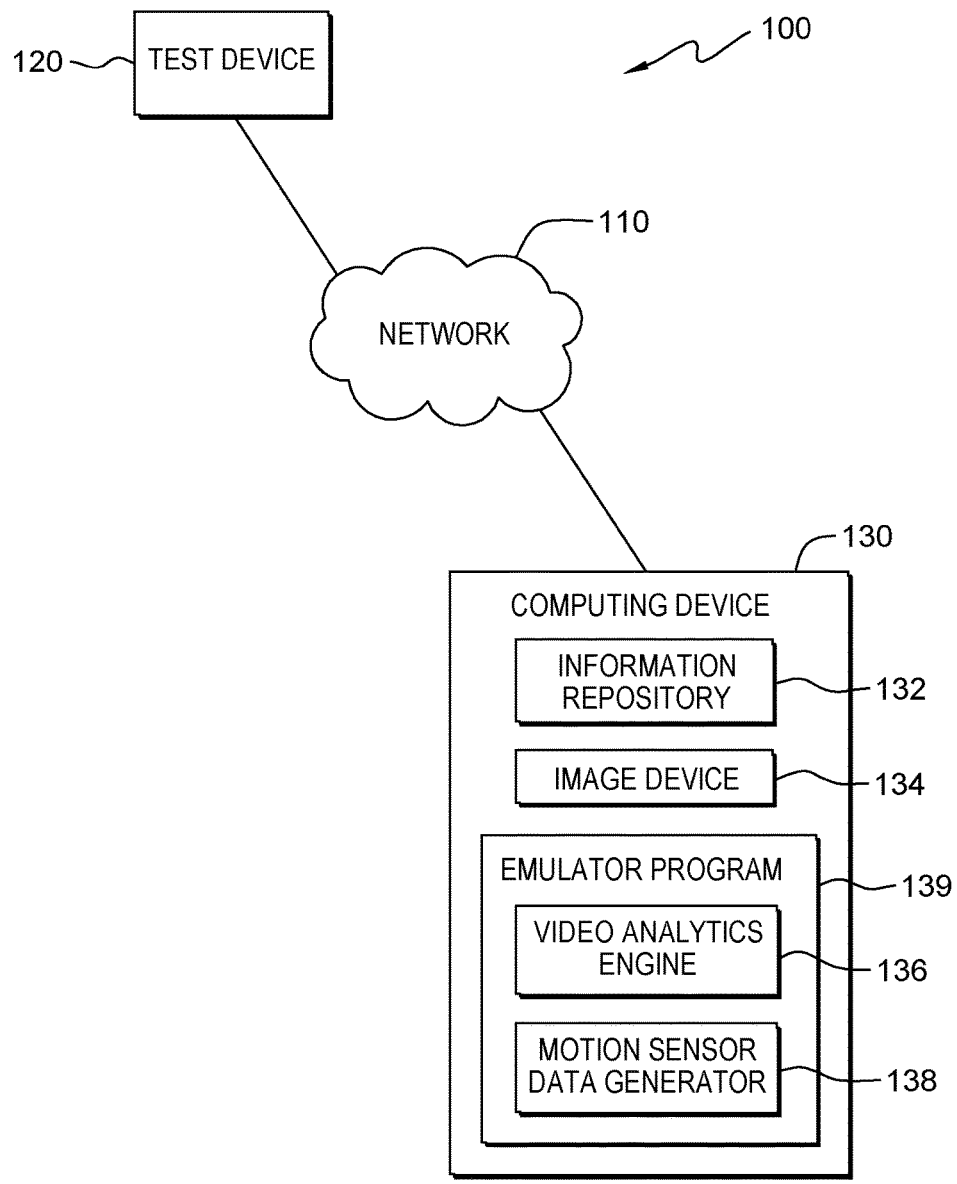
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes test device 120 and computing device 130, connected to network 110. In example embodiments, computing environment 100 may include other computing devices (not shown in FIG. 1) such as smartwatches, cell phones, smartphones, wearable technology, phablets, tablet computers, laptop computers, desktop computers, other computer servers or any other computer system known in the art, interconnected with test device 120 and computing device 130 over network 110.

In embodiments of the present invention, test device 120 and computing device 130 may connect to network 110, which enables test device 120 and computing device 130 to access other computing devices and/or data not directly stored on test device 120 and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between test device 120, computing device 130, and any other computing devices connected to network 110, in accordance with embodiments of the present invention. In an embodiment, data received by another computing device (not shown in FIG. 1) in computing environment 100 may be communicated to test device 120 and computing device 130 via network 110.

In embodiments of the present invention, test device 120 may be a fully functional (i.e., completely operational) laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In another embodiment, test device 120 may be a partially functional (i.e., working but less the completely operational) version of the previously discussed electronic devices. In yet another embodiment, test device 120 may be a mock version of any of the previously discussed electronic devices. In yet another embodiment, test device 120 may be any item that can represent any electronic device.

In embodiments of the present invention, computing device 130 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. Computing environment 100 may include any number of test device 120 and computing device 130. Test device 120 and computing device 130 may include components as depicted and described in further detail with respect to FIG. 4, in accordance with embodiments of the present invention.

In an embodiment, computing device 130 includes information repository 132, image device 134, and emulator program 139.

According to embodiments of the present invention, information repository 132 may be storage that may be written to and/or read by emulator program 139. In one embodiment, information repository 132 resides on computing device 130. In other embodiments, information repository 132 may reside on any other device (not shown in FIG. 1) in computing environment 100, in cloud storage or on another computing device accessible via network 110. In yet another embodiment, information repository 132 may represent multiple storage devices within computing device 130. Examples of data stored to information repository 132 include video files, motion data vectors, motion sensor data, and emulator test results.

In an embodiment, information repository 132 may be implemented using any volatile or non-volatile storage media for storing information, as known in the art. For example, information repository 132 may be implemented with a tape library, optical library, one or more independent hard disk drives, multiple hard disk drives in a redundant array of independent disks (RAID), solid-state drives (SSD), or random-access memory (RAM). Similarly, information repository 132 may be implemented with any suitable storage architecture known in the art, such as a relational database, an object-oriented database, or one or more tables. In an embodiment of the present invention, emulator program 139 and any other programs and applications (not shown) operating on computing device 130 may store, read, modify, or write data to information repository 132.

According to embodiments of the present invention, image device 134 is a device capable of capturing photographs and/or video of test device 120. In an embodiment, image device 134 may be a camera integrated into computing device 130 (e.g., an integrated webcam). In another embodiment, image device 134 may be a stand-alone camera connected to computing device 130 via a hardwire connection (e.g., a cable), connected to computing device 130 wirelessly, or not connected to computing device 130. In the embodiment with the hardwire connection, data is transferred from image device 134 to computing device 130 via the cable. In the embodiment with the wireless connection, data is transferred from image device 134 to computing device 130 via network 110. In the embodiment with no connection between image device 134 and computing device 130, data is transferred by moving a memory device, such as a portable storage device (not shown in FIG. 1), from image device 134 to computing device 130 so that the data may be transferred. In yet another embodiment, image device 134 may be a camera, integrated or stand-alone, that takes and stores still pictures (i.e., photographs) which may be converted into a video file by image device 134 or another application (not shown in FIG. 1). In the embodiment, the video file may be transferred from image device 134 to computing device 130 via techniques previously discussed or by any other technique known in the art. In general, image device 134 is a device capable of taking photographs and/or video of an object.

In an embodiment, emulator program 139 includes video analytics engine 136 and motion sensor data generator 138.

According to embodiments of the present invention, video analytics engine 136 determines video content analytics (VCA). In an embodiment, VCA is the capability of automatically analyzing video to detect and determine temporal and spatial events. VCA is used in a wide range of domains including entertainment, health-care, retail, automotive, transport, home automation, safety and security. Algorithms used by VCA can be implemented as software on general-purpose machines, or as hardware in specialized video processing units. Many different functionalities can be implemented in VCA. Video Motion Detection (VMD) is one of the simpler forms where motion is detected with regard to a fixed background scene. More advanced functionalities include video tracking and egomotion (i.e., the three dimensional motion of a camera within an environment) estimation. Based on the internal representation that VCA generates in the machine, it is possible to build other functionalities, such as identification, behavior analysis, or other forms of situation awareness. In an embodiment, video analytics engine 136 uses VMD to generate motion vector data from a video file stored to information repository 132. In the embodiment, the generated motion vector data is stored to information repository 132. In an embodiment, motion vector data are two dimensional movement vectors of an item with respect to a reference item. In the case of video data, the motion vector data provides an offset of an item from the coordinates in a recent frame to the coordinates of the item in an earlier frame.

According to embodiments of the present invention, motion sensor data generator 138 generates motion sensor data from the determined motion vector data that was determined by video analytics engine 136 and stored to information repository 132. In an embodiment, motion sensor data is the raw data generated by a motion sensor such as an accelerometer, gyroscope, gravity sensor, linear acceleration sensor, rotation vector sensor, and any other motion sensor known in the art. In an embodiment, a discrete motion sensor data generator will be available for each sensor included in a wearable device (i.e., if a wearable device includes an accelerometer, there will be an accelerometer data generator included in emulator program 139). In an embodiment, each discrete motion sensor data generator will use the determined motion vector data as input in order to determine a data format of that type. In other words, if the application testing requires gyroscope data, the gyroscope data generator will use the motion vector data to generate output similar to an actual gyroscope.

In another embodiment, motion sensor data may be generated using cognitive analysis of existing information during the building and training of an emulator. In an embodiment, the motion sensor data generator will include a database of motion vector data that is mapped into motion sensor data. In the embodiment, the mapping is considered a labelling process, which is done manually offline. In the embodiment, motion vectors determined from a sensor included in a wearable device are labelled with corresponding motion sensor data values taken from the database. In an embodiment, rules are learned from the labelled data that define relationships between motion vector displacement and motion sensor displacement. In the embodiment, the learned rules are provided to the emulator to be used to generate motion sensor data from motion vector data.

According to embodiments of the present invention, emulator program 139 may be a program, a subprogram of a larger program, an application, a plurality of applications, or mobile application software, which functions to generate data for testing applications designed for wearable devices via an emulator. A program is a sequence of instructions written by a programmer to perform a specific task. Emulator program 139 may run by itself but may be dependent on system software (not shown in FIG. 1) to execute. In one embodiment, emulator program 139 functions as a stand-alone program residing on computing device 130. In another embodiment, emulator program 139 may work in conjunction with other programs, applications, etc., found in computing environment 100. In yet another embodiment, emulator program 139 may be found on other computing devices (not shown in FIG. 1) in computing environment 100, which are interconnected to computing device 130 via network 110.

In an embodiment, emulator program 139 may receive input of a video file. In an embodiment, emulator program 139 may determine motion vector data from the video file. In an embodiment, emulator program 139 may generate motion sensor data from the motion vector data. In an embodiment, emulator program 139 may store both the motion vector data and the motion sensor data to an information repository. In an embodiment, emulator program 139 may receive an indication that a user has loaded an application for testing. In an embodiment, emulator program 139 may retrieve applicable motion sensor data from the information repository. In an embodiment, emulator program 139 may send the motion sensor data to an emulator to be used by the emulator for testing the application. In an embodiment, emulator program 139 may store the test results from the emulator.

Figure 2:
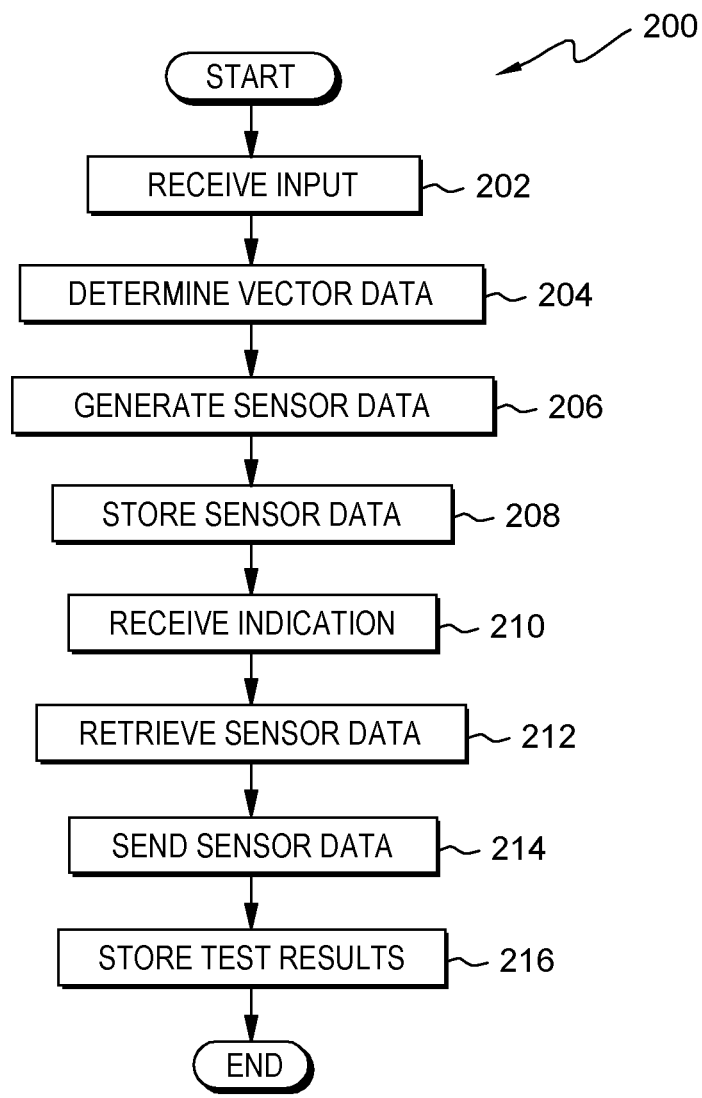
FIG. 2 depicts a flowchart of a program for generating data for testing applications designed for wearable devices via an emulator, in accordance with an embodiment of the present invention.

FIG. 2 is a flowchart of workflow 200 depicting a method for generating data for testing applications designed for wearable devices via an emulator. In one embodiment, the method of workflow 200 is performed by emulator program 139. In an alternative embodiment, the method of workflow 200 may be performed by any other program working with emulator program 139. In an embodiment, a user, via a user interface (not shown in FIG. 1), may invoke workflow 200 upon powering on an image device. In an alternative embodiment, a user may invoke workflow 200 upon accessing emulator program 139.

In an embodiment, emulator program 139 receives an input (step 202). In other words, emulator program 139 receives input of a video file. In an embodiment, the video file is being captured by an image device, such as image device 134, integrated into the same computing device where emulator program 139 resides. In another embodiment, the video file is being captured by an image device hard-wired to the computing device where emulator program 139 resides. In yet another embodiment, the video file is being transferred to the computing device where emulator program 139 from a memory device such as a thumb drive or memory card. In yet another embodiment, the video file is being wirelessly transferred to the computing device where emulator program 139 resides. According to an embodiment of the present invention, the subject of the video file is a test device being moved to mimic the movements of a wearable device being worn by a user. In an embodiment, the wearable device being mimicked may be a smart-watch, a head-mounted display, a fitness band, an article of wearable clothing, or any other wearable device known in the art. In an embodiment, test device 120 is being worn on the wrist of a user and video is taken, by image device 134, of test device 120 being moved in three dimensions (i.e., the x-axis, the y-axis, and the z-axis) by the user. For example, "Joe" is wearing a highly visible band, which is simulating a smart-watch on a wrist, and "Joe" is moving the highly visible band in three dimensions while the laptop computer owned by "Joe" is capturing video.

In an embodiment, emulator program 139 determines vector data (step 204). In other words, emulator program 139 uses video motion detection (VMD) to determine motion vector data from the video file. According to embodiments of the present invention, VMD is included in a video analytics engine that is available to emulator program 139. In an embodiment, the video analytics engine decodes the video file and extracts the motion vector data for the object being moved in the video. In an embodiment, decoding converts base-band analog video signals to digital components video from which the motion vector data is extracted. In an embodiment, video analytics engine 136 included in emulator program 139 determines motion vector data from the received video file (step 202). For example, motion vector data is determined from the video of "Joe" moving the highly visible band on a wrist.

In an embodiment, emulator program 139 generates sensor data (step 206). In other words, emulator program 139 generates motion sensor data from the determined motion vector data (step 204). In an embodiment, motion vector data is received. In an embodiment, weights are initialized. In an embodiment, weights are determined. In an embodiment, rules are generated. Please refer to the FIG. 3 below for a more detailed discussion of generating motion sensor data.

In an embodiment, emulator program 139 stores data (step 208). In other words, emulator program 139 stores the received video file (step 202), the determined motion vector data (step 204), the generated motion sensor data (step 206), and the determined rules (step 206) to storage. In an embodiment, the received video file, the determined motion vector data, the generated motion sensor data, and the determined rules are stored to information repository 132 on computing device 130. For example, the video of "Joe" moving the highly visible band on a wrist, the motion vector data determined the video of "Joe" moving the highly visible band on a wrist, the motion sensor data generated from the motion vector data and the generated rules from the motion sensor data are stored to a memory on the laptop computer owned by "Joe".

According to embodiments of the present invention, the stored data is stored in a shared repository (e.g., in cloud storage) so that the data is accessible for any number of other users. In an embodiment, the stored data is available to the public for use by anyone. In another embodiment, an authorization is required to access the stored data so it is available in a controlled manner by the originating user. In an embodiment, the methodology used to generate the stored data is also stored so that a user may understand how the data was developed.

In an embodiment, emulator program 139 receives an indication (step 210). In other words, emulator program 139 receives an indication of an application to be tested. In an embodiment, the application to be tested would require the use of at least one of the motion sensors included in a wearable device. In an embodiment, the application to be tested is loaded onto computing device 130 by a user. In another embodiment, the application to be tested is loaded onto computing device 130 by another program working with emulator program 139. In an embodiment, emulator program 139 receives an indication of an application being onto computing device 130 by a user. For example, "Joe" loads a fitness application onto the laptop computer owned by "Joe".

In an embodiment, emulator program 139 retrieves sensor data (step 212). In other words, in response to receiving an indication of an application that requires testing being loaded onto a computing device (step 210), emulator program 139 retrieves the data that is associated with the application. In an embodiment, the associated data is defined by a user based on the motion sensors included in the wearable device and may include the motion sensor data for the motion sensors included in the wearable device and the rules generated by the motion sensor data generator. In an embodiment, emulator program 139 retrieves the motion sensor data associated with the application loaded onto computing device 130 from information repository 132. For example, the motion sensor data associated with the fitness application is retrieved from the memory on the laptop computer owned by "Joe".

In an embodiment, emulator program 139 sends sensor data (step 214). In other words, emulator program 139 sends the retrieved data (step 212) to the emulator (not shown) for testing the application. In an embodiment, the emulator is part of an integrated development environment (IDE), which is a software application that provides comprehensive tools for software development and includes a source code editor, various build automation tools, and a debugger. In another embodiment, the emulator is a stand-alone software application, independent of an IDE. In an embodiment, the emulator will use the retrieved data in order to test the application (step 210). In the embodiment, the emulator will use the motion sensor data specific for each sensor that is used by the application (i.e., if the application uses a gyroscope, the emulator will use the retrieved data that is specific to a gyroscope). In an embodiment, emulator program 139 sends the retrieved data to an emulator in an IDE (not shown) found on computing device 130. For example, the data retrieved from the memory on the laptop computer owned by "Joe" is sent to an emulator found on the laptop computer owned by "Joe".

In an embodiment, emulator program 139 stores test results (step 216). In other words, emulator program 139 stores the results from the emulator testing of the application. In an embodiment, emulator program 139 stores the results of the application testing to information repository 132 on computing device 130. For example, the test results from testing the fitness application are stored to a memory on the laptop owned by "Joe".

Figure 3:
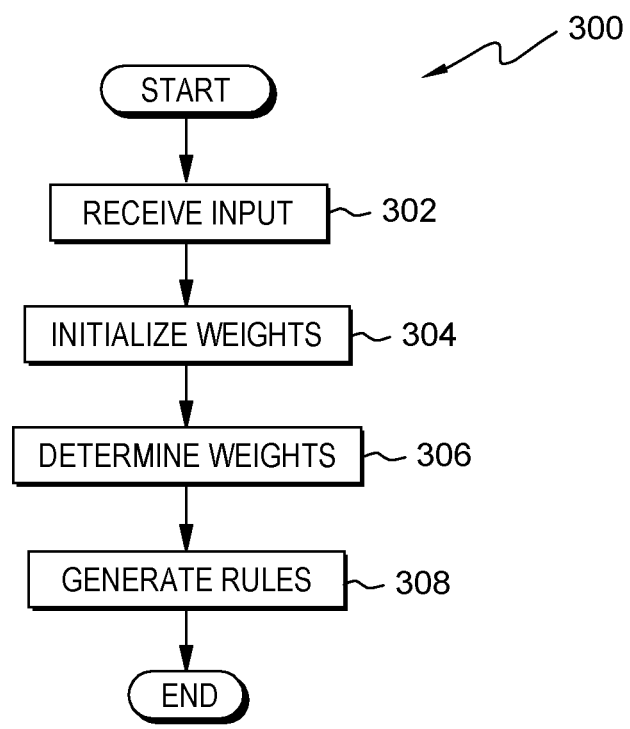
FIG. 3 depicts a flowchart of a program for generating motion sensor data, in accordance with an embodiment of the present invention.

FIG. 3 is a flowchart of workflow 300 depicting a method for generating motion sensor data. In one embodiment, the method of workflow 300 is performed by emulator program 139. In an alternative embodiment, the method of workflow 300 may be performed by any other program working with emulator program 139. In an embodiment, workflow 300 may be invoked upon receiving motion vector data. In an alternative embodiment, a user may invoke workflow 300 upon accessing emulator program 139.

In an embodiment, emulator program 139 receives input (step 302). In other words, emulator program 139 receives the input of the determined motion vector data (step 204). In an embodiment, a discrete motion sensor data generator will be available for each sensor included in a wearable device (i.e., if a wearable device includes an accelerometer, there will be an accelerometer data generator included in emulator program 139). In an embodiment, each discrete motion sensor data generator will use the determined motion vector data as input in order to determine a data format of that type. In other words, if the application testing requires gyroscope data, the gyroscope data generator will use the motion vector data to generate output similar to an actual gyroscope. In an embodiment, emulator program 139 generates motion sensor data from the received input. For example, the laptop computer owned by "Joe" generates accelerometer data to be used in the testing of the fitness application.

In an embodiment, emulator program 139 initializes weights (step 304). In other words, emulator program 139 initializes (i.e., sets the starting value) for the variable value (i.e., weights) for the determined motion vector data. In an embodiment, the initialization is such that all variable values are equal. In another embodiment, the initialization of the variable values is random. In yet another embodiment, the initialization is based on user input. In yet another embodiment, the initialization is based on historical data of motion vector data. In an embodiment, emulator program 139 initializes the motion vector data variable value(s).

In an embodiment, emulator program 139 determines weights (step 306). In other words, emulator program 139 determines the final weights of the variable value(s). According to embodiments of the present invention, a machine-learning algorithm is used to determine the final weights. In an embodiment, machine-learning algorithms include artificial neural networks, decision trees, random forests, nearest neighbors, the Apriori algorithm, and the like. In an embodiment, a machine-learning algorithm is chosen and is run iteratively to progress from the initial weights to the final weights. In an embodiment, emulator program 139 uses the Apriori algorithm through several iterations to determine the final weights that best fit the motion vector data.

In an embodiment, emulator program 139 generates rules (step 308). In other words, emulator program 139 generates rules (i.e., a model) from the final weights that best fit the motion vector data for use in emulator testing of an application for a wearable device. In an embodiment, the generated rules allow for the conversion of motion vector data to motion sensor data. In an embodiment, emulator program 139 generates rules based on the final weights of the variable value(s).

Figure 4:
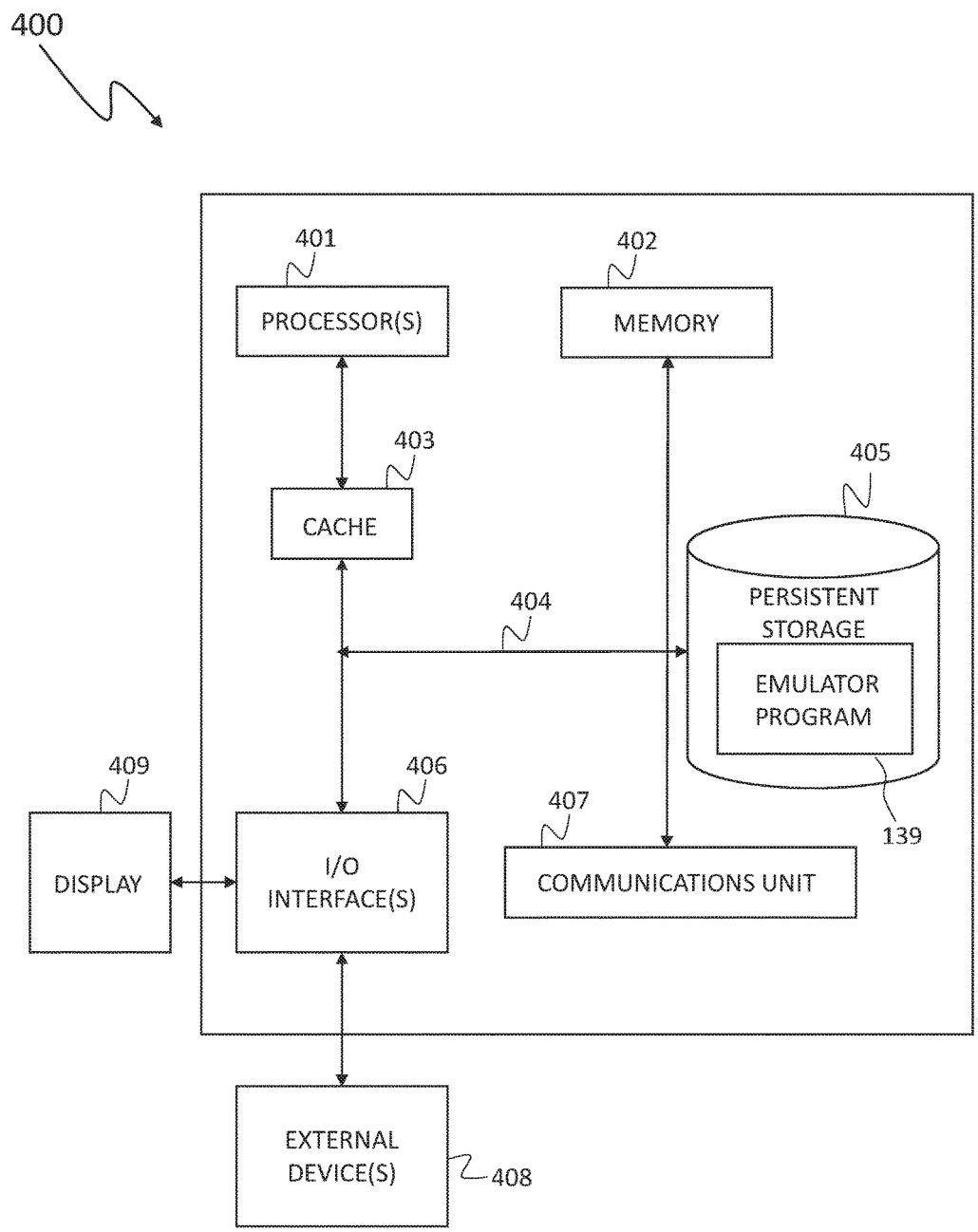
FIG. 4 depicts a block diagram of components of the computing environment of FIG. 1, in accordance with an embodiment of the present invention.

FIG. 4 depicts computer system 400, which is an example of a system that includes emulator program 139. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for generating data for testing applications designed for wearable devices via an emulator, the method comprising:

receiving, by one or more computer processors, an input of a video file, wherein:
the video file includes video of a test device being moved to mimic movements of a wearable device as worn by a user;

determining, by one or more computer processors, motion vector data, based on the video file, using video motion detection (VMD);

generating, by one or more computer processors, motion sensor data based on the determined motion vector data, wherein generating the motion sensor data based on the determined motion vector data comprises:
determining, by one more computer processors, an initial weight for each motion vector in the determined motion vector data, wherein the initial weight is determined based on an approach selected from the group consisting of: selecting equal weights, selecting random weights, user input, and historical data;
determining, by one or more computer processors, a final weight for each motion vector in the determined motion vector data, wherein:
a machine-learning algorithm is used to determine the final weight for each motion vector in the determined motion vector data;
the machine-learning algorithm is selected from the group consisting of: artificial neural networks, decision trees, random forests, nearest neighbors, and Apriori algorithm; and
the machine-learning algorithm is run iteratively starting with the initial weight for each motion vector in the determined motion vector data in order to determine the final weight; and
generating, by one or more computer processors, one or more rules that best fit the determined motion vector data, wherein:
the generated one or more rules are based on the final weight for each motion vector in the determined motion vector data;
the generated one or more rules allow for conversion of the motion vector data to the motion sensor data; and
generating the one or more rules that best fit the determined motion vector data comprises:
mapping, by one or more computer processors, existing motion vector data to motion sensor data, wherein the mapping is an offline labelling process using cognitive analysis;
labelling, by one or more computer processors, new motion vector data with corresponding motion sensor values based on a mapping of the existing motion vector data to motion sensor data; and
generating, by one or more computer processors, one or more rules that define a relationship between motion vector displacement and motion sensor displacement based on the new motion vector data labelled with corresponding motion sensor values;

determining, by one or more computer processors, one or more test results using the generated motion sensor data;

storing, by one or more computer processors, the video file, the motion vector data, and the motion sensor data, and the one or more rules;

receiving, by one or more computer processors, an indication of an application to be tested, wherein:
the application to be tested uses one or more motion sensors included in the wearable device; and
the application to be tested is a fitness application;

retrieving, by one or more computer processors, the motion sensor data associated with the application to be tested, wherein the association of the motion sensor data to the application to be tested is based on receiving the motion sensor data that corresponds to one or more sensors included in the wearable device;

causing, by one or more processors, an emulator to test the application, using the retrieved motion sensor data associated with the application to be tested, wherein the emulator uses respective motion sensor data, corresponding to each sensor that is used by the application;

determining, by one or more computer processors, one or more test results based on the retrieved motion sensor data; and storing, by one or more computer processors, the one or more test results.

* * * * *